United States Patent [19]

Kanuch et al.

[11] 4,208,443

[45] Jun. 17, 1980

[54] PROCESS FOR RETARDING MOLD IN GRAIN

[75] Inventors: George M. Kanuch, Duluth, Minn.; Charles H. Staff, Omaha, Nebr.

[73] Assignee: Fairmont Foods Company, Omaha, Nebr.

[21] Appl. No.: 816,388

[22] Filed: Jul. 18, 1977

Related U.S. Application Data

[63] Continuation-in-part of Ser. No. 740,956, Nov. 11, 1976, abandoned.

[51] Int. Cl.$^2$ ............................ A23B 9/00; A23L 3/34
[52] U.S. Cl. .................................. 426/331; 426/335; 426/310; 426/615; 426/618; 426/634
[58] Field of Search ............... 426/310, 324, 331, 335, 426/532, 615, 618, 634, 636

[56] References Cited

U.S. PATENT DOCUMENTS

| | | | |
|---|---|---|---|
| 2,934,438 | 4/1960 | Michener et al. | 426/331 X |
| 3,021,219 | 2/1962 | Melnick | 426/310 |
| 3,608,085 | 9/1971 | Papworth | 426/331 X |
| 3,873,747 | 3/1975 | Thomassen | 426/324 X |
| 3,979,525 | 9/1976 | Plemons et al. | 426/335 X |

OTHER PUBLICATIONS

Chemical Week, Oct. 6, 1971, pp. 50-51.
Nester, E. W. et al., "Microbiology", Holt, Rinehart and Winston, Inc., N.Y., 1973, pp. 289, 581 & 582.

*Primary Examiner*—Robert A. Yoncoskie
*Attorney, Agent, or Firm*—Henry L. Brinks; Joan I. Norek

[57] ABSTRACT

A method is provided for reducing spoilage of high moisture grain resulting from mold growth. The high moisture grain is treated on all surfaces with ethyl alcohol or an ethyl alcohol solution containing a microbial preservative. Spoilage as by mold growth is retarded for over a year while the products are stored at ambient temperatures.

27 Claims, 3 Drawing Figures

PROCESS FOR RETARDING MOLD IN GRAIN

This application is a continuation-in-part of copending application, U.S. Ser. No. 740,956, filed on Nov. 11, 1976, now abandoned.

The present invention relates to retarding mold growth in high moisture grain, and more particularly, to reducing mold growth on such products stored at ambient temperatures. By the term "grain" used herein is meant the seeds or fruits of various food plants and the term is not limited to, but includes, various cereal grasses. By the term "high moisture" is meant that the grain has not been processed after harvesting and prior to storage to remove any substantial amount of moisture for preservation purposes.

BACKGROUND OF THE INVENTION

Various grains find universal use and appeal when processed into food products. These products may be manufactured in large volume a considerable time after harvesting the grain. The grain must therefore be stored during the time lapse between harvesting and processing. Storage under refrigerated conditions is not practical, the amount of refrigeration storage space often being severely limited or not available at all. Moreover, refrigerated storage of large volumes of grain is unduly expensive and consumes an extensive amount of energy.

High moisture grain stored at ambient temperatures is severely subject to mold and yeast growth. Grain, because it grows in a natural environment, is heavily contaminated with a wide variety of types of molds and yeasts when harvested. Spores of mold and yeast are also contained in the atmosphere. Within four days to two months after harvest, grain stored at ambient temperatures, typically, 70° to 80° F., is subject to mold growth. Mold growth, of course, precludes processing of grain into food products.

Chemical preservatives such as propionic acid and acetic acid have been known to retard mold and yeast growth on high moisture grain, but it is an expensive preservative agent and use of such preservatives necessitates treating the inside of the storage bins to prevent damage from corrosion.

Drying grain has long been recognized as a means for reducing mold and yeast growth. The most common method used today is drying by natural gas. Now, in an age of energy shortage, a method for reducing spoilage not dependent upon a high energy requirement would be advantageous. Additionally, the most convenient drying apparatus, a storage bin with a self-contained drying unit, requires a large capital investment. Reduction of moisture content of grain has also been accomplished by exposure of the grain to the sun's radiant energy prior to storage. This method has the disadvantage of being weather dependent. Even locations with normally good climatic conditions for grain drying are subject to the whims of the weather.

The use of ethyl alcohol to retard mold spoilage of packaged pizza crusts is known from U.S. Pat. No. 3,979,525. Pizza crusts are composed essentially of wheat flour which has been subjected to vigorous processing which reduces the fat, fiber and protein content as compared to unprocessed high moisture grain. The problems of preserving two very different commodities such as pizza crusts and high moisture grain are not surprisingly very different also. Pizza crusts have very little yeast and mold contamination because the baking process essentially kills all yeast and mold contamination and the only contamination of concern is that occuring after baking. For instance, a typical mold and yeast count for pizza crusts is less than 10 per gram of product as compared to a mold and yeast count of 100,000 per gram of high moisture grain. These two commodities are also subject to attack by different types of mold. Pizza crust have a tendency to spoilage from growth of penicillium mold. For high moisture grain however, suitable protection against growth of aspergillus mold is the problem presented upon storage.

Accordingly, it is a principal object of the invention to reduce the spoilage of high moisture grain resulting from mold growth and yeast growth. It is an object to reduce the spoilage of high moisture grain that has not been processed prior or during storage to remove a substantial amount of moisture for preservative purposes.

It is another object of the present invention to provide a method for reducing spoilageof grain resulting from mold growth without the necessity of reduction of moisture content or refrigeration.

It is still another object of the invention to reduce spoilage of high moisture grain resulting from mold growth by using inexpensive methods which meet legal and industraily accepted standards.

These and further objects of the invention will be apparent from the following description, appended drawings, and attached claims.

DESCRIPTION OF THE INVENTION

It is a discovery of the present invention that spoilage arising from mold growth can be reduced by treating the surface of high moisture grain with ethyl alcohol. As pointed out above, high moisture grain, if maintained at ambient temperatures, will develop mold growth in a relatively short period of time. On the other hand, if the surface is treated with alcohol in amounts described hereinafter or with a solution of alcohol and a preservative, according to the present invention, spoilage by mold growth can be substantially eliminated very unexpectedly for periods of time up to over one year, even though the products are maintained at ambient temperatures, and even though the grain is contained in a non-hermetic storage.

Although alcohol has been used as an antibacterial agent, it is not known to prevent germination of mold spores in high moisture grain as hereinafter described. Accordingly, it is another discovery of the invention that mold growth can be retarded by surface treatment of the grain with ethyl alcohol.

Briefly stated, therefore, the present invention is directed to reducing the spoilage of high moisture grain caused by mold growth by treating the surfaces of the grain with ethyl alcohol or an ethyl alcohol solution of a microbial preservative, such as sorbic acid or propionic acid or salts thereof.

Mold growth on high moisture grain is related to the moisture content. Moisture content is expressed herein as water activity (represented by the symbol Aw) which is the measure of the amount of free water present in a multicomponent system, expressed in terms of the ratio of water in the grain to the vapor pressure of pure water at a given temperature. Microorganisms, such as bacteria and molds, can utilize only free water for their metabolic processes, and water which is tightly bound to the molecules in the grain is not available for their use. The range under which spoilage by most bacteria is eliminated is generally Aw values less than about 0.92. Mold growth occurs at Aw values above 0.70.

Thus, the surfaces of grain with Aw values of 0.70 to 0.92 show spoilage resulting primarily from mold growth, rather than from any significant bacterial growth, because the amount of free water in the food products is sufficiently high for mold to grow but is too low to permit substantial growth of bacteria.

Grain is already severely contaminated with mold spores when harvested. The mold spores ordinarily germinate, grow, and spoil the grain within a short period of time, if untreated, as explained hereinabove.

Hereinafter the process of the present invention will be described and illustrated by reference to a specific grain, for example soybeans and corn. The invention is not limited to these grains, however, and it is apparent that the novel features and attendant advantages of the present invention may be utilized in conjunction with a variety of grains.

Figure 1:
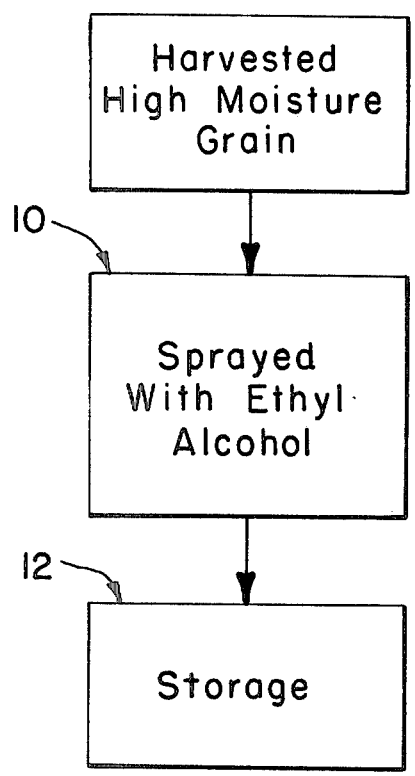
FIG. 1 is a flow diagram illustrating the treatment and storage of grain comprising the steps in the process of the present invention.

Referring now to the drawing, FIG. 1 is a flow sheet illustrating the steps included in the process of the present invention.

The grain, according to conventional practice, would be air dried at ambient temperatures to remove a substantial amount of water from the grain. According to the present invention, however, the grain is treated and then stored at a high moisture content, eliminating the drying process.

Ethyl alcohol is applied to surfaces of the grain as indicated at 10. Although the ethyl alcohol may be applied to the surfaces by many techniques, such as applying directly, spraying is preferred when the process is used on a commercial scale. Storage, preferably in a closed grain storage bin, is indicated at 12.

Figure 2:
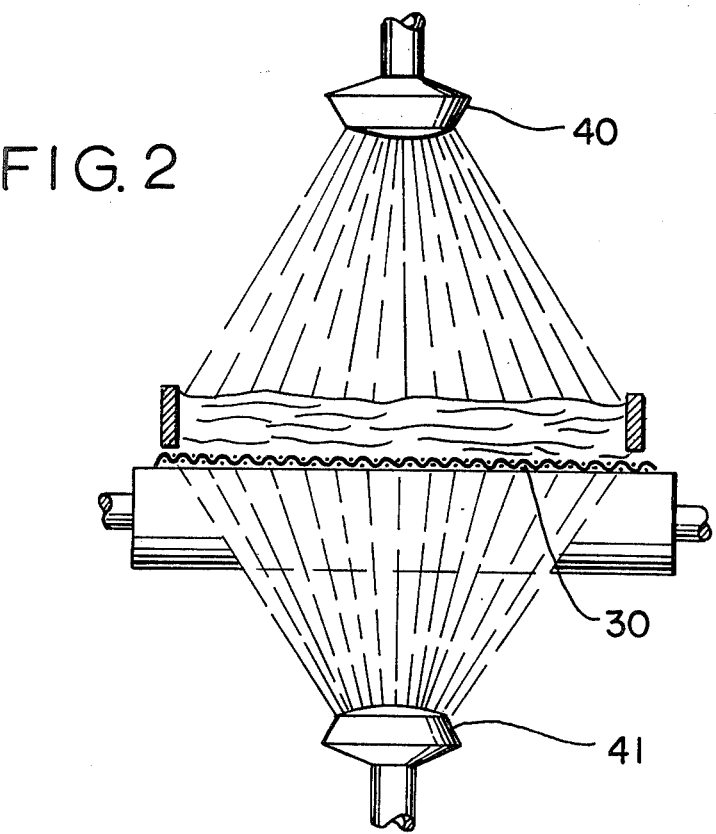
FIG. 2 is a diagrammatic view illustrating a preferred method of treating grain (on a commercial scale) with alcohol according to the process of the present invention.

Referring to FIG. 2, there is illustrated a preferred method for applying alcohol to the grain. A layer of grain is moved on a wire-mesh roller type conveyor belt 30 between upper and lower spray nozzles 40 and 41 which direct fan-shaped alcohol sprays to the bottom and top of the layer of grain, respectively. The alcohol sprays are sufficiently wide so as to also apply alcohol to substantially all the surfaces of the layer of grain. The wire-mesh belt being perforated admits alcohol spray to the bottom of the grain layer from the nozzle. Alternatively the grain could be sprayed while being conveyed as in a spiral direction on a screw conveyor.

The ethyl alcohol may be either denatured or undenatured. Successful results have been achieved with undenatured 85% to 95% ethyl alcohol or with denatured ethyl alcohols which are satisfactory for food usage.

The alcohol is applied in amounts of at least about 0.2 percent, preferably at least about 0.5 percent based on the weight of the grain. The upper limit of the amount of alcohol application is about 5 percent based on the weight of the grain. Amounts greater than 2 percent are usually unnecessary to obtain retardation of mold growth for substantial time periods.

Figure 3:
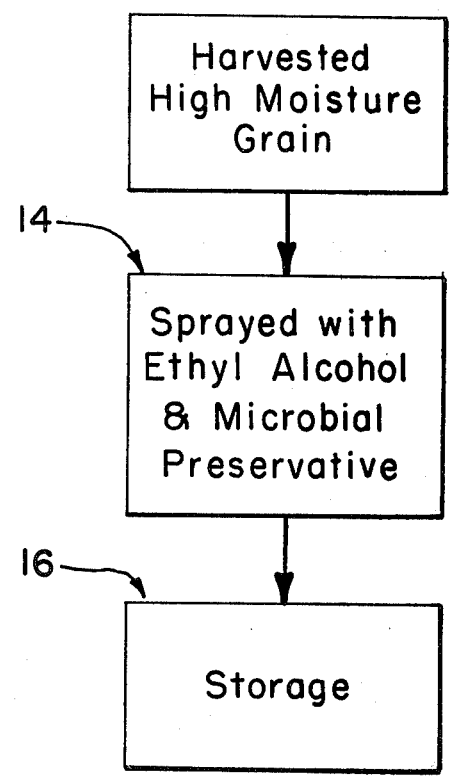
FIG. 3 is a flow diagram illustrating the treatment and storage of grain comprising steps in a preferred embodiment of the present invention.

The alcohol applied may optionally contain up to 15 percent of a known microbial preservative preferably selected from the group consisting of sorbic acid, propionic acid and their sodium, potassium and calcium salts, as shown in FIG. 3.

As finally illustrated in FIG. 1, the grain is stored. The storage should be performed as soon as possible after the alcohol treatment. Storage is usually within ten minutes, and preferably within five minutes, after the alcohol application.

The grain is maintained in a closed bin. The grain may be stored in any manner sufficient to prevent substantial evaporation of moisture and alcohol. In any event, it is desirable to maintain substantially constant humidity within the storage bin.

The invention is further illustrated in the following examples, which are not intended as limitation on the invention, but as an additional exemplifications thereof.

EXAMPLE I

Samples of corn, having an Aw value of about 0.858 and a moisture content of about 20.48% were treated with ethyl alcohol in the following amounts, expressed as percent of alcohol based on the total weight of the corn:

| Sample | % Ethyl Alcohol |
|--------|-----------------|
| A | 0.5 |
| B | 1.0 |
| C | 1.5 |
| D | 2.0 |
| E | none |
| F | none |

Samples E and F were untreated and served as a control group. Samples ranged in size from 190 to 230 grams.

After treatment with alcohol, the samples were stored at ambient temperatures in Mason jars (½ pint) with the following results.

| Sample | First Mold Noticed (Days) |
|--------|---------------------------|
| A | 8 |
| B | 125 |
| C | 385 |
| D | none at 593 |
| E | 4 |
| F | 4 |

EXAMPLE II

Samples of soybeans, having an Aw value of about 0.723 and a moisture content of about 10.79 percent, were prepared by adding water in the following amounts to obtain samples with a moisture level of approximately 20 percent:

| Samples | Weight of grain (grams) | Weight of Added Water (grams) | Percent Water |
|---------|-------------------------|-------------------------------|---------------|
| A | 147.6 | 16.4 | 20.7 |
| B | 129.6 | 14.4 | 20.7 |
| C | 142.3 | 15.8 | 20.7 |
| D | 154.3 | 17.44 | 20.7 |

| Samples | Weight of grain (grams) | Weight of Added Water (grams) | Percent Water |
|---|---|---|---|
| E | 148.0 | 16.44 | 20.7 |
| F | 139.7 | 15.5 | 20.7 |

The samples were then treated with ethyl alcohol in the following amounts, expressed as percent alcohol based on combined weight of soybeans and added water:

| Sample | % Ethyl Alcohol |
|---|---|
| A | 0.5 |
| B | 1.0 |
| C | 1.5 |
| D | 2.0 |
| E | none |
| F | none |

Samples E and F were untreated and served as a control group.

After treatment with alcohol, the samples were stored as in Example I with the following results:

| Sample | First Mold Noticed (Days) |
|---|---|
| A | 125 |
| B | none at 593 |
| C | none at 593 |
| D | none at 593 |
| E | 20 |
| F | 54 |

The moisture level of the soybean samples in Example II was increased to about 20 percent to demonstrate the advantages of the present invention under conditions both realistic to commercial use and adverse to the storage of the soybeans, without spoilage.

In both Examples I and II, all the samples were treated with ethyl alcohol by direct application to the sample.

EXAMPLE III

Samples of corn were treated with alcohol solutions of potassium sorbate and propionic acid to demonstrate the preservative effects of ETOH when used in conjunction with other microbial preservatives.

Corn with a moisture content of 25 percent and an Aw value of 0.88 was used. This corn was harvested at 25 percent moisture, thereby requiring no additional moisture. The grain was placed into gallon size glass jars and lids were secured on top to prevent loss of moisture or ethyl alcohol.

The following experimental variables were used:
A—control—no preservative
B—1.5% ethyl alcohol
C—1.5% solution of ethyl alcohol with 5% potassium sorbate
D—1.5% solution of ethyl alcohol with 10% propionic acid The following observations were made:

| Variable | First Mold Noticed (Days) |
|---|---|
| A | 11 |
| B | 105 |
| C | 145 |
| D | 182 |

This data does show the additional storage time of high moisture grain that can be obtained by using ethyl alcohol in combination with other known preservatives.

Mold analyses conducted on samples of grain at various times during storage showed lower mold counts on samples treated with ethyl alcohol plus potassium sorbate or propionic acid than on samples treated with ethyl alcohol only.

The storage units for the alcohol-treated products may be sealed or unsealed. If the storage units are unsealed, they are preferably closed to reduce loss of moisture and alcohol.

Although mold and yeast growth are ordinarily referred to collectively, spoilage of grain is due primarily to germination of mold spores. It is a discovery of this invention that spoilage due to germination of mold spores can be retarded and reduced over a period of time by the surface treatment of alcohol as more fully set forth above.

Accordingly, one of the important discoveries of the invention is the fact that ethyl alcohol will retard mold growth. While ethyl alcohol is a known bacteriacide, it is not known nor used as a fungicide, particularly as a fungicide for cereal grains.

From the foregoing, it is believed that the advantages of the invention should be apparent. Cereal grains treated according to the process set forth hereinabove can be stored at ambient temperatures as long as over one year. This permits the processing of the grain, for example, into food products, in large volumes at locations long distances from storage a substantial time after harvest, without spoilage. By surface treatment, high surface concentrations are achieved without large amounts of alcohol.

The amounts of alcohol used in the invention, while adding to the initial costs of the products, is offset by the saving realized in the unrefrigerated storage and reduced spoilage. The amounts of alcohol required to prevent spoilage are remarkably small, and the retardation of mold and yeast growth resulting therefrom is a surprising microbiological effect.

While not intending to be bound by any theory, the following is offered as assisting in understanding the invention. It is believed that the alcohol reduces the mold growth and spoilage of the product by retarding germination of the mold spores. Apparently, the contamination of the grain with spores is effectively treated by surface application of the alcohol. It is believed that in storage after treatment, a process of vapor pressure equalization of alcohol occurs which tends to permeate the entire bulk. The alcohol vapor pressure equalization process results in fungicidal activity beyond the immediate area of the alcohol application and further results in enhancing fungicidal activity, beyond that which can be deposited thereon in the areas of alcohol deposition.

In the drawing and specification, there has been set forth preferred embodiments of the invention, although specific terms are employed, these are used in a generic and descriptive sense only, and not for the purpose of limitation. Changes in form as well as substitution of equivalents are contemplated, as circumstances may suggest or render expedient, without departing from the spirit or scope of this invention, as further defined in the following claims.

What is being claimed is:

1. A method of extending the storage life of high moisture grain contaminated at least on some surfaces thereof by viable mold spores by retarding spoilage caused by mold and yeast growth, and which is adapted to reduce spoilage due to germination of mold spores, comprising the steps of:
   harvesting the grain;
   applying a preservative agent consisting essentially of ethyl alcohol to any of the surfaces of said grain subject to contamination with mold spores, without drying the grain after harvest to substantially reduce its moisture content;
   said alcohol being applied in an amount from about 0.2 to 5.0 percent of alcohol based on the total weight of the grain; and
   storing said grain with the alcohol within a period of time following said alcohol application so as to prevent significant losses of the alcohol through vaporization from the surfaces thereof.

2. The method of claim 1 wherein said grain has a water activity value of at least 0.70.

3. The method of claim 1 wherein said grain is treated with alcohol by spraying a layer of said grain with alcohol while said layer is being conveyed horizontally.

4. The method of claim 1 wherein said grain is treated with alcohol by spraying a layer of said grain with alcohol while said layer is being conveyed on a screw conveyor.

5. The method of claim 1 wherein said high moisture grain is cereal grain.

6. The method of claim 1 wherein said grain is corn.

7. The method of claim 1 wherein said grain is soybeans.

8. A method of extending the storage life of high moisture grain contaminated at least on some surfaces thereof by viable mold spores by retarding spoilage caused by mold and yeast growth, and which is adapted to reduce spoilage due to germination of mold spores, comprising the steps of:
   harvesting the grain;
   applying an active preservative agent consisting essentially of ethyl alcohol to any of the surfaces of said grain subject to contamination with mold spores, said grain having a water activity value of at least 0.7;
   said alcohol application being at least 0.2 percent of alcohol based on total weight of grain to retard the germination of said mold spores; and
   storing said grain in a closed container within a period of time following said alcohol application so as to prevent significant losses of the alcohol through vaporization from the surfaces thereof.

9. The method of claim 8 wherein said grain is cooled to temperatures below about 80° F. prior to the alcohol application.

10. The method of claim 8 wherein the surfaces of said grain product is below about 65° F. during said alcohol application.

11. The method of claim 8 wherein the water activity value of said grain is within the range of 0.70 to 0.92.

12. The method of claim 8 wherein said grain is treated with alcohol in the range from about 0.2 to 5.0 percent of alcohol based on total weight of grain.

13. The method of claim 8 wherein said grain is treated with alcohol by spraying a layer of said grain with alcohol while said layer is conveyed horizontally.

14. The method of claim 8 wherein said grain is treated with alcohol by spraying a layer of said grain with alcohol while said layer is being conveyed on a screw conveyor.

15. The method of claim 8 wherein said high moisture grain is a cereal grain.

16. The method of claim 8 wherein said grain is corn.

17. The method of claim 8 wherein said grain is soybeans.

18. A method of extending the storage life of high moisture grain contaminated at least on some surfaces thereof by viable mold spores by retarding spoilage caused by mold and yeast growth, and which is adapted to reduce spoilage due to germination of mold spores, comprising the steps of:
   harvesting the grain;
   applying a solution of ethyl alcohol to any of the surfaces of said grain subject to contamination with mold spores, said alcohol solution consisting essentially of ethyl alcohol and up to 15 percent of a microbial preservative selected from the group consisting of propionic acid, sorbic acid and salts thereof;
   said alcohol solution being applied at a level of at least 0.2 percent of alcohol based on total weight of grain to retard the germination of said mold spores; and
   storing said grain within a period of time following said alcohol application so as to prevent significant losses of the alcohol through vaporization from the surfaces thereof.

19. The method of claim 18 wherein said grain is cooled to temperatures below about 70° F. prior to the alcohol application.

20. The method of claim 18 wherein the surfaces of said grain product are below about 65° F. during said alcohol application.

21. The method of claim 18 wherein said grain has a water activity value of at least 0.70.

22. The method of claim 18 wherein said grain is treated with said alcohol solution in the range from about 0.2 to 5.0 percent of alcohol based on total weight of grain.

23. The method of claim 18 wherein said grain is treated with said alcohol solution by spraying a layer of said grain with said alcohol solution while said layer is conveyed horizontally.

24. The method of claim 18 wherein said grain is treated with said alcohol solution by spraying a layer of said grain with said alcohol while said layer is being conveyed on a screw conveyor.

25. The method of claim 18 wherein said high moisture grain is a cereal grain.

26. The method of claim 18 wherein said grain is corn.

27. The method of claim 18 wherein said grain is soybeans.

* * * * *